(No Model.)
H. C. McCAFFERTY.
MAP HOLDER.
No. 605,969. Patented June 21, 1898.
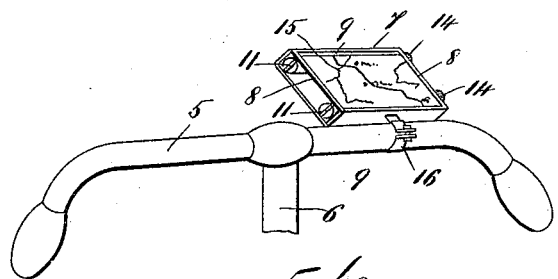
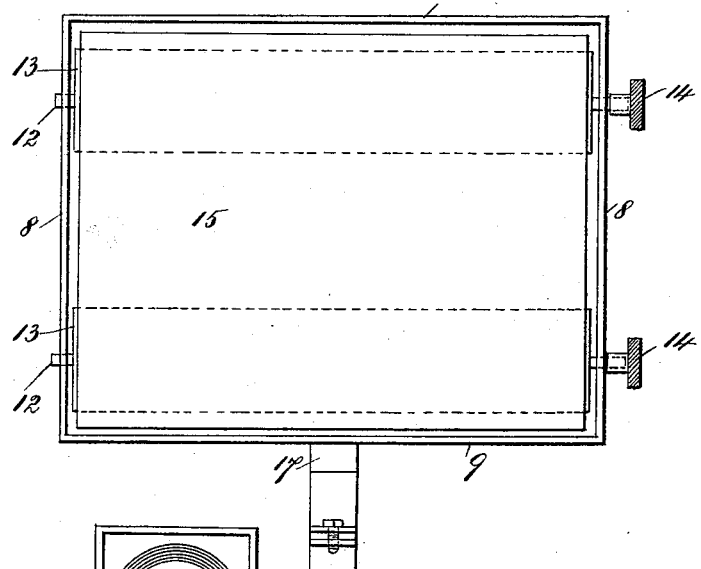
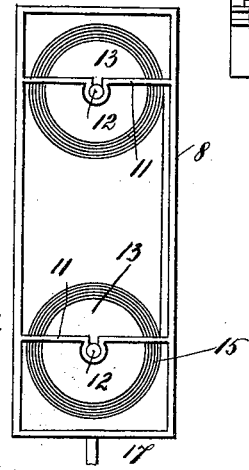
WITNESSES:
John Buckler,
C. Gerst
INVENTOR
Harry C. McCafferty
BY Edgar Tate & Co
ATTORNEYS.

UNITED STATES PATENT OFFICE.

HARRY C. McCAFFERTY, OF MONTCLAIR, NEW JERSEY.

MAP-HOLDER.

SPECIFICATION forming part of Letters Patent No. 605,969, dated June 21, 1898.

Application filed July 13, 1897. Serial No. 644,383. (No model.)

*To all whom it may concern:*

Be it known that I, HARRY C. MCCAFFERTY, a citizen of the United States, residing at Montclair, in the county of Essex and State of New Jersey, have invented certain new and useful Improvements in Map-Holders for Bicycles or Similar Vehicles, of which the following is a full and complete specification, such as will enable those skilled in the art to which it appertains to make and use the same.

This invention relates to map-holders for bicycles and similar vehicles; and the object thereof is to provide an improved device of this class which is adapted to be connected with the handle-bar of a bicycle or similar vehicle or with some other part of the frame of the vehicle where it may be seen by the rider and which is provided with a plurality of rollers on which a map may be wound and with means for revolving one or both of said rollers, so as to turn the map thereon.

The invention is fully disclosed in the following specification, of which the accompanying drawings form a part, in which—

Figure 1 is a perspective view of the handle-bar of a bicycle or similar vehicle and showing my improvement connected therewith; Fig. 2, a side view of the map-holder and the means for connecting it with the vehicle, and Fig. 3 an end view thereof.

In the drawings forming part of this specification the separate parts of my improvement are designated by the same numerals of reference in each of the views, and in said drawings I have shown at 5 the handle-bar of a bicycle and the central post 6, with which said handle-bar is connected, and in the practice of my invention I provide a frame or holder 7 for a map, which, as shown in the drawings, is connected with the handle-bar 5.

The map-holder consists of an open frame which is rectangular and oblong in form and which is composed of rectangular ends 8, which are connected by two rectangular side pieces 9, and mounted in the open ends 8 are two transverse rods 11, which support shafts 12, each of which is provided with a roller 13, and each of these shafts projects at one end and is provided with knobs or milled heads 14, by which it may be operated, and wound on said rollers is a map 15, and said map may be unwound from either of said rollers onto the other whenever desired.

The map 15 is an ordinary road-map, and the side of the holder in which it is mounted being open and in plain view it will be apparent that said map may be examined at all times by the rider of the vehicle.

The frame or holder is also provided at one side with a clamp 16, by means of which it is connected with the handle-bar, and said clamp is provided with a shank 17, by means of which it is connected with the frame or holder, and it will thus be seen that I accomplish the object of my invention by means of a device which is simple in construction and operation and which is well adapted to accomplish the result for which it is intended.

It will be noted that the transverse rods 11, which support the shafts 12, are formed of wire provided with a central loop forming a bearing-eye and that the rollers are mounted in said bearing-eyes of the transverse rods, whereby the map may be detachably arranged in and carried by said open framework. It will also be noted that in the general construction and arrangement as herein set forth and illustrated the skeleton framework embodies side pieces connected together at their ends by bars which form the open ends, across which are arranged the wire bearing-rods having the open central loops, the ends of said wires being connected to said bars.

Having fully described my invention, I claim as new and desire to secure by Letters Patent—

1. An improved map-holding device for attachment to a bicycle or similar vehicle, comprising an open framework embodying the open rectangular ends, means for attaching the frame to a bicycle or similar vehicle, the transverse bearing-rods extending across said open ends and formed of wire provided with a central loop forming a bearing-eye, the rollers mounted in said bearing-eyes of the transverse rods, and the map wound upon the rollers, whereby the map may be detachably arranged in and carried by said open framework, substantially as and for the purpose set forth.

2. An improved map-holding device for attachment to a bicycle or similar vehicle, comprising an open or skeleton framework embodying side pieces connected together at their ends by bars forming open end portions, two transverse connecting-rods extending across the open ends of said framework and between said bars, said rods being formed of wire and provided centrally with an open loop forming a bearing-eye, and the rollers mounted in said bearing-eyes of the transverse rods and provided with projecting end heads or knobs by means of which the rollers may be turned, substantially as and for the purpose set forth.

In testimony that I claim the foregoing as my invention I have signed my name, in presence of the subscribing witnesses, this 10th day of July, 1897.

HARRY C. McCAFFERTY.

Witnesses:
C. GERST,
A. C. VAN BLARCOM.